3,168,573
STABILIZED FORMALDEHYDE SOLUTIONS
George N. Butter, Terre Haute, Ind., assignor to Commercial Solvents Corporation, New York, N.Y., a corporation of Maryland
No Drawing. Filed June 2, 1961, Ser. No. 114,323
6 Claims. (Cl. 260—606)

My invention relates to stabilized formaldehyde solutions. More particularly my invention relates to a process for stabilizing formaldehyde solutions against excessive polymerization.

Formaldehyde, a product used in large quantities in the chemical industry is generally transported as a 35–50% aqueous solution. The transportation of such solutions however is aggravated by the tendency of formaldehyde to polymerize and then settle out as a polymerized solid from the solution. Polymerization and concurrent deposition increase with decreases in temperature, thus during the cold seasons transportation of concentrated formaldehyde solutions becomes impractical.

Various procedures have been attempted to minimize polymerization and solid deposition in formaldehyde solutions. For example, very low concentrations of formaldehyde in the solution on the order of 5–10% can be transported even in cold weather without excessive polymerization and deposition. However, since water is the main component, this method is practical only when small amounts of formaldehyde are transported. Also various preservatives such as methanol when incorporated in amounts of about 15–20% into the formaldehyde solution have demonstrated ability to impede polymerization. The addition of such large amounts of methanol however, not only is costly but necessitates separation of the methanol from the formaldehyde solution before use can be made of the formaldehyde. More recently it has been found that relatively small amounts of hydroxylamine hydrochloride impede but do not completely prevent polymerization of formaldehyde and deposition from the aqueous solution of the solid polymerized material even under low temperature conditions. However, the difficulty in using hydroxylamine hydrochloride is that even if sufficient concentration is present the material which does polymerize and settle as a solid deposit from the formaldehyde solution on subjection to lower temperature does not return to solution with a subsequent rise in temperature, thus resulting not only in loss of material but necessitating the separation of the polymerized solid material from the formaldehyde solution.

I have now discovered an improved process whereby formaldehyde solutions of industrial concentration can be substantially preserved against polymerization and deposition of solid material even when subjected to lower temperatures. More important however, my process also permits return of polymerized solid materials to solution, which was caused to be deposited from the solution by subjection to lower temperatures, merely by raising the temperature of the solution.

Generally my process consists of adding polymerization retarding amounts of compounds having the following general formula to formaldehyde solutions:

$$(R)_2\text{---}N\text{---}C\text{---}(CH_2OH)_3$$

where R is lower alkyl.

Included among the inhibitors of my invention are N-bis(methyl)-tris(hydroxymethyl)aminomethane, N-bis(ethyl)-tris(hydroxymethyl)aminomethane, N-bis(hydroxybutyl)-tris(hydroxymethyl)aminomethane etc. and the like.

In carrying out my improved process, I have found that when amounts as low as 10 p.p.m. and as high as 500 p.p.m. by weight of my inhibitors based on the weight of the formaldehyde solution are incorporated in the formaldehyde solution, suitable results can be obtained. However, to obtain optimum results, I usually prefer to utilize from about 50 to about 200 p.p.m. of my inhibitors.

The following examples serve to illustrate my invention but it is not intended that my invention be limited to the procedures or specific materials set forth therein.

*Example I*

A 1000 ml. portion of a 44% formaldehyde solution containing a concentration of 50 p.p.m. of N-bis(methyl)-tris(hydroxymethyl)aminomethane and a 1000 ml. portion of a 44% formaldehyde solution containing no inhibitor were heated to 100° F. and maintained at that temperature for thirty days. At the end of the thirty day period the two portions were observed. The first portion containing the inhibitor showed only a small amount of solid deposition while the second portion containing no inhibitor was quite cloudy and showed a great deal of solid deposition. The temperature of the two portions was then lowered to 60° F. and solid deposition occurred in each portion. The two portions were then heated to 120° F. with accompanying agitation. The solid material in the inhibited portion was observed to have substantially disappeared while the solid material in the portion not treated with the inhibitor was observed to be substantially unchanged.

*Example II*

The procedure of Example I was followed except that N-bis(ethyl)-tris(hydroxymethyl)aminomethane was utilized instead of N-bis(methyl)-tris(hydroxymethyl)aminomethane. Results similar to those of Example I were obtained.

*Example III*

The procedure of Example I was followed with the exception that N-bis(butyl)-tris(hydroxymethyl)aminomethane was utilized instead of N-bis(methyl)-tris(hydroxymethyl)aminomethane. Results similar to those of Example I were obtained.

Now having described my invention what I claim is:

1. An aqueous formaldehyde solution comprising aqueous formaldehyde and a sufficient amount of a compound having the following general formula:

$$(R)_2\text{---}N\text{---}C\text{---}(CH_2OH)_3$$

where R is lower alkyl to stabilize said solution against deposition of polymerized material from the solution.

2. An aqueous formaldehyde solution comprising aqueous formaldehyde and a sufficient amount of N-bis(methyl)-tris(hydroxymethyl)aminomethane to stabilize said solution against deposition of polymerized material from the solution.

3. An aqueous formaldehyde solution comprising aqueous formaldehyde and a sufficient amount of N-bis(ethyl)-tris(hydroxymethyl)aminomethane to stabilize said solution against deposition of polymerized material from the solution.

4. An aqueous formaldehyde solution comprising aqueous formaldehyde and a sufficient amount of N-bis(butyl)-tris(hydroxymethyl)aminomethane to stabilize said solution against deposition of polymerized material from the solution.

5. An aqueous formaldehyde solution comprising aqueous formaldehyde and from about 10 p.p.m. to about 500 p.p.m. of a compound having the following general formula: $(R)_2-N-C-(CH_2OH)_3$ wherein R is lower alkyl.

6. An aqueous formaldehyde solution comprising aqueous formaldehyde and from about 50 p.p.m. to about 200 p.p.m. of a compound having the following general formula: $(R)_2-N-C-(CH_2OH)_3$ wherein R is lower alkyl.

References Cited in the file of this patent

UNITED STATES PATENTS

| | | |
|---|---|---|
| 2,000,152 | Walker | May 7, 1935 |
| 2,237,092 | Swain et al. | Apr. 1, 1941 |
| 2,488,363 | Yates | Nov. 15, 1949 |
| 2,492,453 | Yates | Dec. 27, 1949 |

OTHER REFERENCES

Derwent Belgian Patents Report, vol. 60 B, Jan. 15, 1960, page C 18.